United States Patent [19]
Ang

[11] Patent Number: 5,976,295
[45] Date of Patent: Nov. 2, 1999

[54] METHOD OF MOLDING A RECYCLABLE MULTI-LAYER COMPONENT FROM PLASTICS MATERIAL

[75] Inventor: Leoncio C. Ang, Bloomfield Hills, Mich.

[73] Assignee: Chrysler Corporation, Auburn Hills, Mich.

[21] Appl. No.: 08/950,630

[22] Filed: Oct. 15, 1997

Related U.S. Application Data

[62] Division of application No. 08/697,843, Aug. 30, 1996.

[51] Int. Cl.$^6$ .............................. B27N 3/12; B32B 31/20
[52] U.S. Cl. .................. 156/219; 156/62.2; 156/309.9; 156/322; 156/209; 156/83; 156/266; 156/307.3; 156/242; 156/307.7; 156/245; 156/221; 264/258; 264/DIG. 26; 264/DIG. 29; 264/DIG. 75; 296/191; 296/214; 296/39.1; 428/141; 428/174; 428/175
[58] Field of Search ................................ 264/257, 241, 264/258, 172.11, 172.15, DIG. 26, DIG. 29, DIG. 53, DIG. 75; 428/141, 174, 175; 296/191, 214, 39.1; 156/62.2, 309.9, 322, 209, 219, 83, 266, 307.3, 242, 307.7, 245, 221

[56] References Cited

U.S. PATENT DOCUMENTS

| | | | |
|---|---|---|---|
| 3,381,074 | 4/1968 | Bryan et al. | 264/171 |
| 3,840,627 | 10/1974 | Rhodes, Jr. | 264/46 |
| 4,199,635 | 4/1980 | Parker | 428/95 |
| 4,330,584 | 5/1982 | Doerer | 428/91 |
| 4,595,551 | 6/1986 | Maurer | 264/321 |
| 4,600,621 | 7/1986 | Maurer et al. | 428/121 |
| 4,695,501 | 9/1987 | Robinson | 428/159 |
| 4,734,147 | 3/1988 | Moore | 156/275.1 |
| 4,812,186 | 3/1989 | McConnell et al. | 156/90 |
| 4,840,832 | 6/1989 | Weinle et al. | 428/156 |
| 4,882,002 | 11/1989 | Ando et al. | 156/310 |
| 4,992,320 | 2/1991 | Gower | 428/184 |
| 5,007,976 | 4/1991 | Satterfield et al. | 156/222 |
| 5,026,586 | 6/1991 | Tabor | 428/90 |
| 5,049,439 | 9/1991 | Robinson | 428/286 |
| 5,064,714 | 11/1991 | Yamaguchi et al. | 156/245 |
| 5,075,162 | 12/1991 | Okubo et al. | 428/304.4 |
| 5,089,328 | 2/1992 | Doerer et al. | 156/307.3 |
| 5,164,254 | 11/1992 | Todd et al. | 156/198 |
| 5,211,792 | 5/1993 | Carter | 156/245 |
| 5,254,402 | 10/1993 | Okubo et al. | 428/317.7 |
| 5,258,089 | 11/1993 | Tanaka et al. | 156/83 |
| 5,275,865 | 1/1994 | Nicolay | 428/174 |
| 5,362,546 | 11/1994 | Boulanger | 428/138 |
| 5,486,256 | 1/1996 | Romesberg et al. | 156/251 |
| 5,503,903 | 4/1996 | Bainbridge et al. | 428/182 |
| 5,591,289 | 1/1997 | Souders et al. | 156/245 |
| 5,639,324 | 6/1997 | Biggs et al. | 156/83 |
| 5,660,908 | 8/1997 | Kelman et al. | 478/74 |
| 5,846,368 | 12/1998 | Sakaguchi et al. | 156/83 |

*Primary Examiner*—Jan H. Silbaugh
*Assistant Examiner*—Robin S. Gray
*Attorney, Agent, or Firm*—Kenneth H. Maclean

[57] ABSTRACT

A method of molding a component such as a headliner or sun visor for the interior of automotive vehicles is molded from different thermoplastic materials from the same family that can be subsequently recycled as a whole without the need of separation into its constituents. The interior component is a multi layer composite of polyester (PET) finishing fabric, a resilient layer of bicomponent polyester fiber padding composed of blend of a low melting point fibers and high melting point fibers, and a relatively stiff core layer of polyester/glass fiber composite of polyester and glass fibers. The different fibers of the core layer are blended into a thin and porous sheet which is cut to size. The cut sheets are consolidated and molded under heat and pressure into a light weight, dense and structurally strong composite. A mold charge comprises the polyester/glass fiber composite layered with the bicomponent. The charge is heated in an oven and transferred to an open mold having the polyester finishing fabric facing therein. The mold is dosed and pressure is applied to complete formation of the headliner or sun visor component.

2 Claims, 3 Drawing Sheets

METHOD OF MOLDING A RECYCLABLE MULTI-LAYER COMPONENT FROM PLASTICS MATERIAL

CROSS-REFERENCES TO RELATED APPLICATIONS

This application is a division of pending application Ser. No. 08/697,843, filed Aug. 30, 1996 by the same inventor as in the present application.

FIELD OF THE INVENTION

This invention relates to recyclable components for the interior of automotive vehicles formed from a single family of recyclable plastics material and molded into a substantially rigid, light weight composite for ready installation to the occupant compartment of a vehicle.

BACKGROUND OF THE INVENTION

Prior to the present invention, various headliners have been molded from plastics material for use in the occupant compartment in the automotive vehicles. For example, in U.S. Pat. No. 4,330,584 issued May 18, 1982, a self-supporting or rigid automotive headliner is formed with a substrate layer of expanded polystyrene which is relatively rigid. The molded panel has an intermediate layer of polyester urethane foam (a thermoset material) for soft feel and a knitted cloth or vinyl skin employed as a finishing interior cover of the panel.

The substrate layer may also be extruded in sheet form and may be compression molded in matching dies. The intermediate flexible urethane foam layer of this panel may be vacuum formed over the substrate and secured thereto by adhesive. The flexible foam layer may also be formed by spraying it directly on the back of the substrate without use of the adhesive. In addition to these components of different families of materials, the finished layer is provided by a flexible decorative cover of vinyl skin or cloth which is fused to the intermediate layer by flame laminating in which the surface of the intermediate layer becomes tacky and the cover layer is fused thereto.

In U.S. Pat. No. 4,840,832, a resilient vehicle headliner is molded from a batt of textile fibers which may be formed from polyesters, such as PET with an elongation of 10 percent to provide resiliency. A portion of these fibers are bicomponent fibers having a low melting point component for use as bonding agents to secure a thin surface layer of foam thereto. Polyurethane, a thermoset material which is not a readily recyclable material, is a disclosed prior art foam. The foam layer contributes to the acoustical properties of the headliner while providing a soft surface to which a textile fabric layer is bonded thereto to provide the finished interior surface of the headliner. The headliner of this patent disclosure lacks a stiff core layer comparable to that of the present invention so that it is resilient and flexible. This allows this headliner to be bent or flexed nearly double allowing it to be passed through the side vehicle windows to facilitate headliner installation. Such headliner constructions are particularly suitable for headliner replacement purposes.

SUMMARY OF THE INVENTION

While these prior art patents selectively disclose rigid and flexible headliners of various plastics material and may employ bicomponent plastics fibers for bonding purposes, such as in the patent '832, they do not disclose the new and improved recyclable headliner composite from one polymer family as in the present invention which in preferred embodiment is made of (1) polyester (PET) fabric that can be woven, non-woven or knitted, (2) a layer of bicomponent polyester padding that is a blend of low temperature melting point fibers for bonding and higher temperature melting point fibers for resiliency and "soft feel" intermixed with one another, and (3) a core layer of polyester/glass fiber, such as 75% terephthalate and 25% long glass fibers for rigidity and self support.

The polyester/glass fibers for the core are preferably blended in a wet lay process similar to that used in paper making. A conveyer carries the wet blend of mixed fibers to an oven to provide a very porous and thin (about 1 mm thickness) continuous sheet product that is rolled and later cut to required size. The sized sheet can be molded into a very light weight and stiff composite by consolidating several sheets under heat and pressure and can be molded into a structurally strong composite of selected thickness. The sheets of the polyester/glass fiber composite are layered to the desired thickness. The number of sheets used is variable and may, for example, comprise a stack of 10 to 15 sheets each 1 mm thick. The bicomponent polyester fiber pad is placed on the top of the composite to form the basic molo charge. A sheet of loose, non-woven polyester scrim may be added to the charge to cover the exposed composite surface, if desired. Depending on the bicomponent fiber material used, the charge is heated in a convection oven to a predetermined temperature, such as temperature of 160° centigrade for a suitable time period to melt the low temperature bicomponent fiber material and is then transferred to the opened mold that has the facing or finishing sheet of PET fabric therein. After being charged, the mold is closed with an apply pressure of 1 to 10 psi. The mold can be constructed so that air can be evacuated therefrom to establish a vacuum to hold the facing fabric in place in the mold and to assist mold cooling and thereby shorten the molding time. After cooling, the molded composite is removed from the mold and trimmed as necessary.

After being molded and trimmed, the headliner is ready to be installed as a basically stiff self-supporting component. The stiff headliner can be readily handled manually or by automated equipment and inserted and held while being fastened to the interior of the occupant compartment of the vehicle. The installed headliner and the resilient padding thereof will not sag even when exposed to high humidity and to temperature environments such as experienced by vehicles in tropical zones and hot desert areas. This invention further has a long service life with desirable soft feel provided by the resilient bicomponent padding with a pleasing and desirable finish provided by the polyester finishing sheet.

After service life, the headliner of this invention can be readily removed from the vehicle and moved as a unit to a recycling center where it can be particulized or otherwise treated without preliminary separation into the different portions or components thereof to provide the raw material for subsequent use, such as to make fibers for the core composites to be used in the production of other headliners, or for making fiberglass filled injection moldable resin for other products.

A feature, object and advantage of this invention is to provide a new and improved recyclable headliner and method for producing headliners of a polyester family material that provides improved "no sag" headliner with stability even when exposed to high humidity and elevated temperatures such as experienced by vehicles in tropical or hot desert climates.

Another feature, object and advantage of this invention is to provide a new and improved recyclable headliner and method for producing multi layer headliners of a polyester family material that has a rigid core layer and with polyester fiber padding and polyester finishing fabric which can be easily handled and installed, that will not sag even when exposed to high humidity and elevated temperatures such as experienced by vehicles in tropical or hot desert climates.

These and other features, objects and advantages of this invention will become more apparent from the following detailed description and drawings in which:

DETAILED DESCRIPTION OF THE DRAWINGS

Referring more particularly to the drawings, an automotive interior component such as headliner 10 or sun visor or door trim panel according to the present invention is compression molded from a plurality of different forms of thermoplastic materials emanating from a common family of polyester materials to provide a new and improved self-supporting and non-sagging unit which is readily recyclable.

Figure 2:
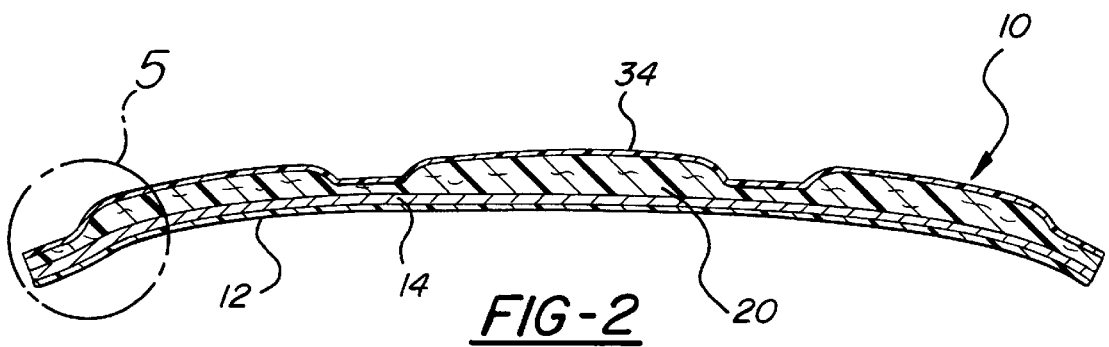
FIG. 2 is a cross-sectional view of the headliner of FIG. 1 taken along lines 2—2 thereof.

In a preferred embodiment illustrated by headliner 10 in FIG. 2, a thin sheet of polyester finishing fabric 12 is shown in overlying relationship to a thicker resilient padding 14 of mixed polyester fibers to cooperatively provide a soft feel and finally finished interior for the occupant compartment of the vehicle.

Figure 5A:
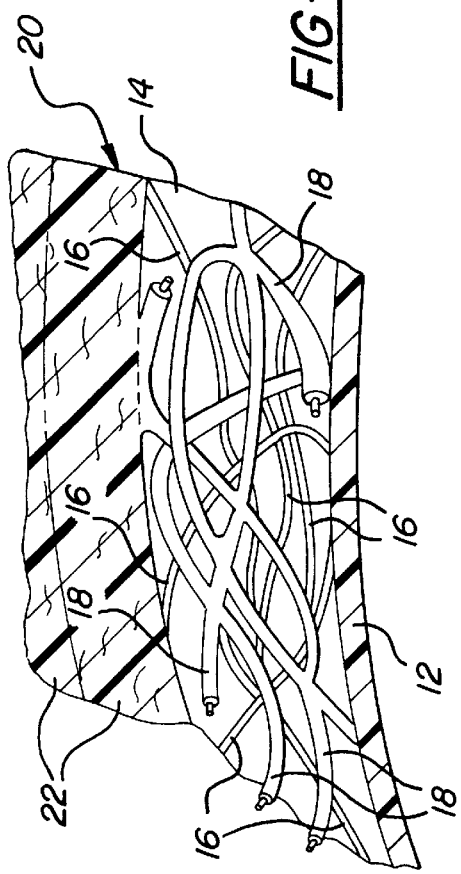
FIG. 5A is an enlarged view of a portion of bicomponent fiber constituent of the headliner encircled by area 5A of FIG. 5.

The mixed fiber padding 14 that may comprise single component fibers 16 and bicomponent fibers 18 of polyester material is diagrammatically shown in FIG. 5a. Fibers 16 and 18 have different melt temperatures so that the higher temperature melt fibers 16 can be used primarily as resilient filling while the low temperature melt of bicomponent fibers can be used as filling and as a binder to join fibers and the components of the headliner together.

In addition to the finishing fabric 12 and the mixed fiber padding 14, a robust body or core 20 of the headliner providing desired rigidity to prevent headliner sag is formed from a plurality of polyester and glass fiber sheets 22.

Figure 1:
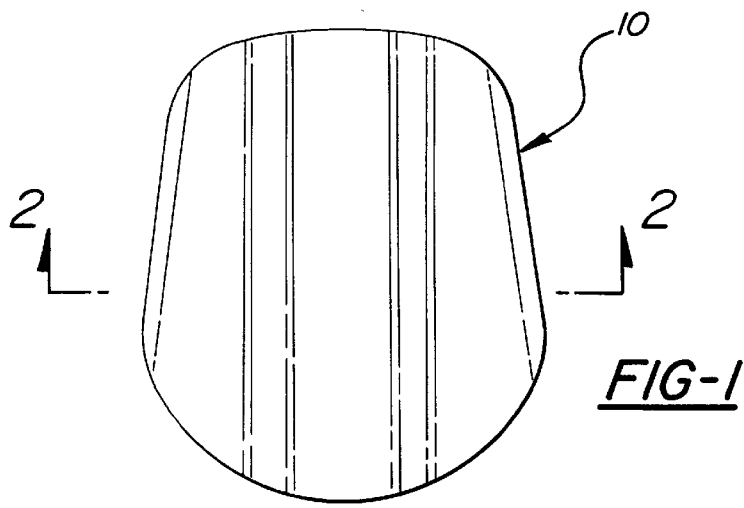
FIG. 1 is a top view of the headliner for use in an automotive vehicle.
Figure 3:
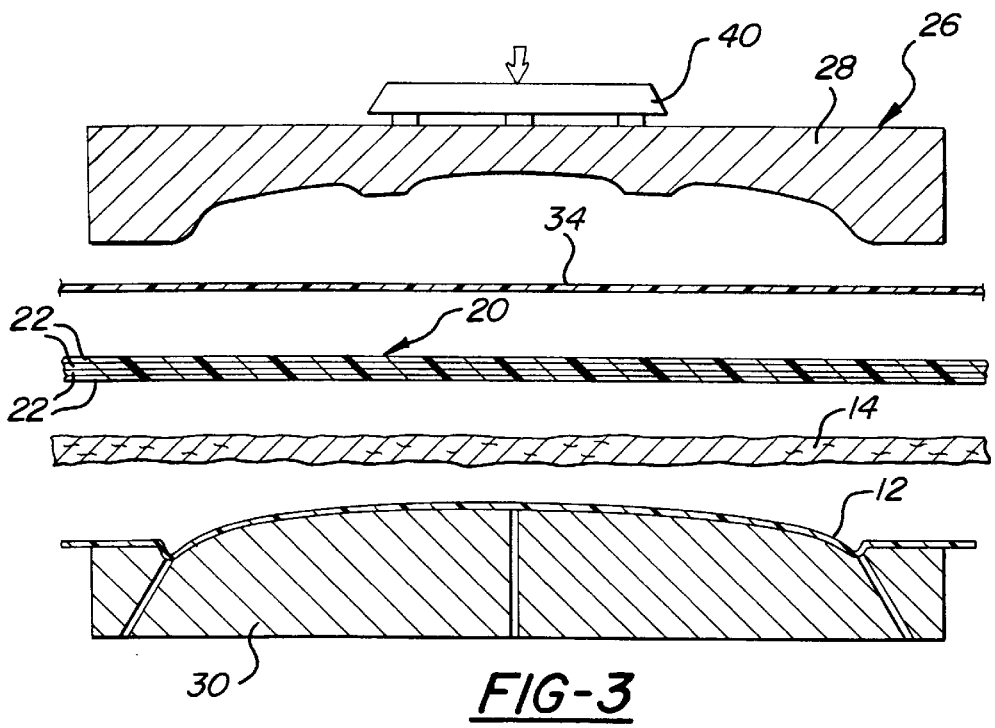
FIG. 3 is an exploded cross-sectional and diagrammatic view of a mold and a mold charge of different polyester materials from the same family between open mold halves.
Figure 5:
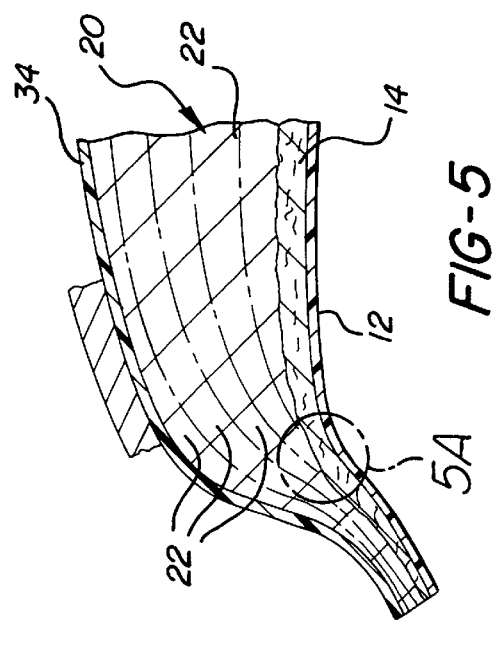
FIG. 5 in an enlarged view of a portion of the headliner encircled by area 5 of FIG. 2.
Figure 4:
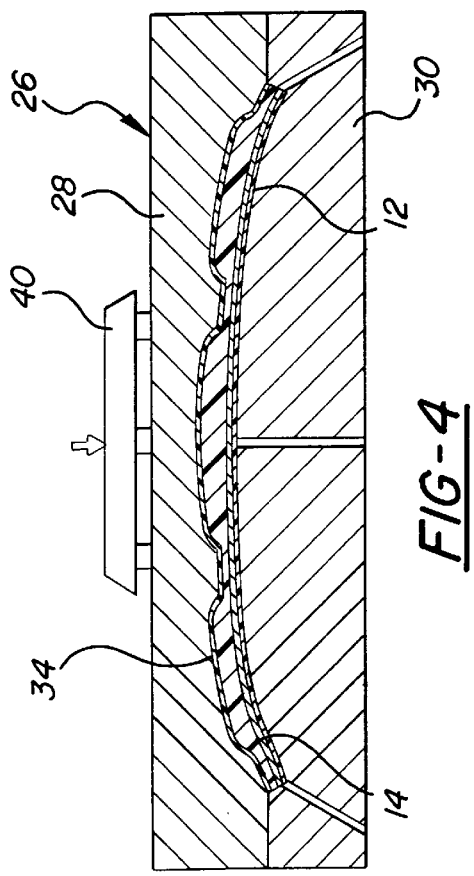
FIG. 4 is a sectional view of the mold of FIG. 3 in the closed position.

The core and the padding can be initially stacked or combined to provide a primary charge 24 for a mold 26 whose mold halves 28 and 30 shown in open position in FIG. 3. The charge is then heated in a convection oven or by other means to a given temperature such as 160° C. and transferred in the heated conditions into the mold cavity. The polyester finishing sheet material 12 is layered into the mold prior to the feed of the primary charge thereto. Furthermore, a sheet of loosely woven polyester scrim 34 can be added to the charge to form the outer periphery of the molded headliner shown in FIG. 2. After the polyester constituents, comprising the charge 24, the finishing fabric or material 12 are in place, the mold halves operatively mounted in press 40 are closed under predetermined load to mold the polyester constituents into the headliner 10 whose fixed shape is diagrammatically shown in FIGS. 1 and 2.

The polyester fabric 12 which forms the preferred form of the facing of the headliner can be knitted, woven or nonwoven from polyester fiber into a thin fabric sheet. In any event, this facing is preferably a flexible covering for the resilient padding 14 of fibers and extends therewith across the entire area of the headliner.

The padding 14 shown in best detail in FIG. 5A is made from different forms of polyethylene terephthalate (PET) fibers with long fibers 16 randomly coursing through the padding and being of sufficient lengths and quantity to provide resiliency desired for the padding. Fibers 16 have a higher temperature melting point as compared with the bicomponent fibers 18. The fibers 18 incorporate a PET copolymer which has a lower melting point temperature as compared to the fibers 16. This provides a thermoplastics adhesive or bond when the pad is heated to a temperature in the range of 160–200° C. Accordingly, when the charge is heated into the predescribed temperature range and formed under pressure in the mold 26, the bicomponent polyester fibers bond at their contact points with one another and with fibers 16. Importantly, bonding also occurs with the interior surfaces of the finishing fabric 12 and the core layer 20 as diagrammatically shown in FIG. 5a. The bonding, accordingly, securely interconnects the various polyester components of the headliner with one another subsequent to heating, molding and cooling. With such component bonding, the components are unitized to a point where there is no sagging even when higher temperature environments are experienced in the vehicle.

Figure 6:
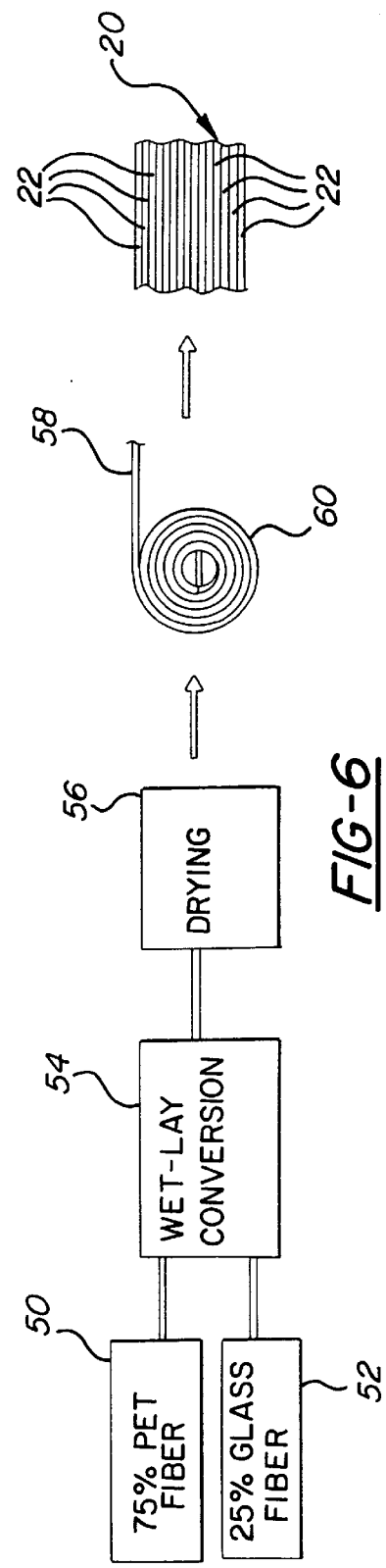
FIG. 6 is a schematic illustration of the manufacture of the core layer of the headliner of this invention.

The core 20 is a composite of polyester and glass fiber sheets preferably made of 75% recycled polyester fibers and 25% glass fibers. These two kinds of fibers are inter layered in a wet layer process, such as diagrammatically shown in FIG. 6. The polyester PET fibers 50 and glass fibers 52 are wet layered at station 54 and then conveyed through an oven 56 which effects the drying of the combined fibers into a very porous, thin, continuous sheet that may be stored and handled as a roll 60. The continuous sheet 58 can be later cut to the desired or required size for subsequent molding. These sheets can be molded into a very light weight composite by consolidating a number of sheets under heat and pressure.

In the preferred embodiment, the molding charge 24 will comprise a plurality of sheets of the polyester/glass fiber composite sheets 22 layered to a desired thickness, for example, 10 to 15 sheets each of 1 mm thick can be used and the bicomponent polyester fiber padding can be added to form the charge 24 shown in FIG. 3. The scrim 34 can be added to the charge. The charge 24 is heated in a convection oven, 160° C. for example until it is unified, and then can be transferred to mold 26 that has the facing 12 supplied thereto. The mold is then closed under the pressure of the press 40 and a pressure 1–10 psi is applied. The mold is opened after the part has cooled and the molded part is removed and then trimmed.

Figure 7:
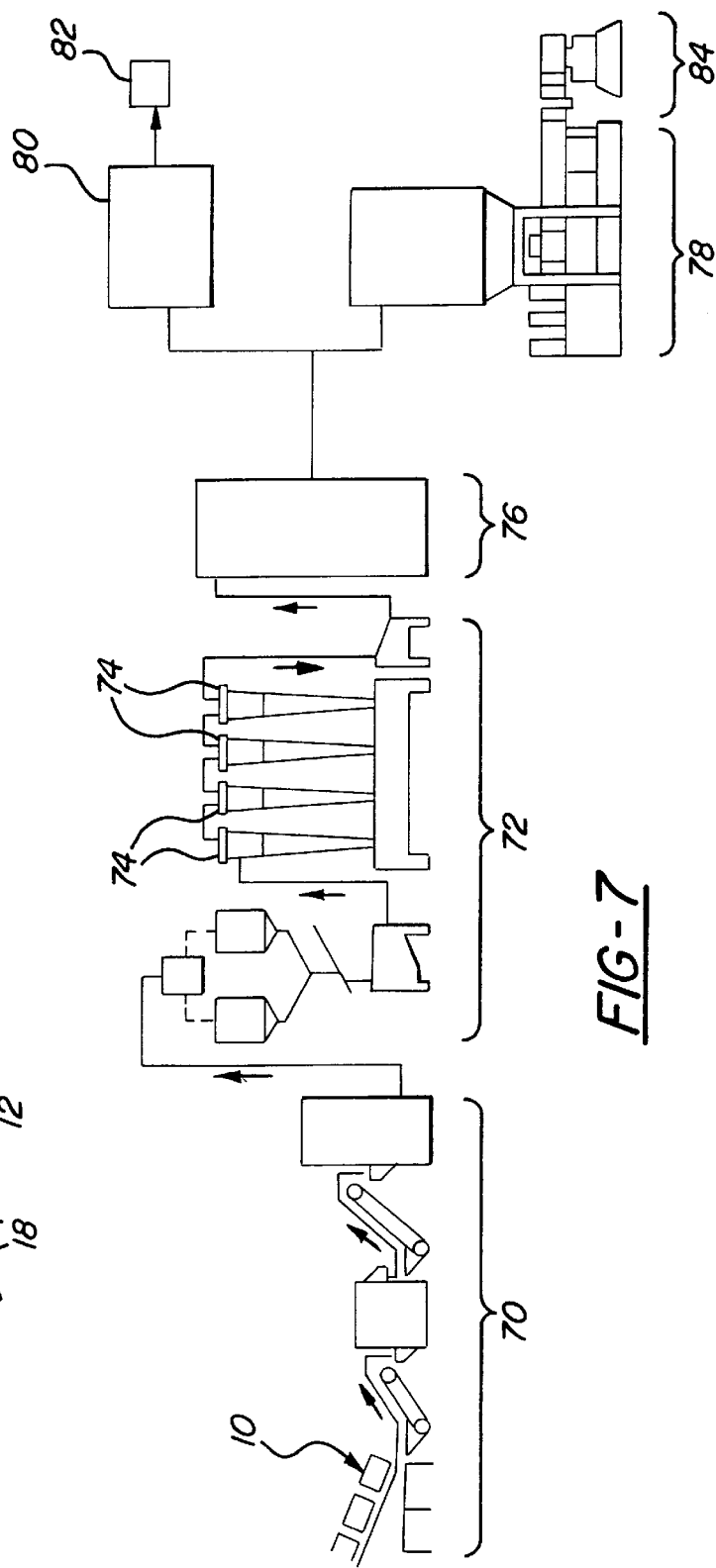
FIG. 7 is a schematic view of apparatuses and methods for recycling headliners such as those of FIGS. 1 and 2.

FIG. 7 diagrammatically illustrates the recycling of headliners 10 after completion of service life in a vehicle. In FIG.

7 automated material handling and cutting and grinding equipment 70 cuts or separates the headliner into particles. The particles are pumped or otherwise conveyed into the partially cleaning and separating station 72 which includes a series of cyclone separators 74 which separates foreign matter from the particles. Washed and separated particles of headliner material are then supplied to drying station 76 where they are dried using a suitable heat source. The particles of the headliner are then sent to station 80 for conversion by methanolysis into raw material 82 for fiber production that may be used for other headliner cores. The other suitable process particles of the headliner can also be sent to extruding, filtering and pelletizing equipment 78 and 84, which converts the particles into glass filled injectable moldable resins that are usable for other components or plastics articles.

While a preferred embodiment of the invention has been shown and described, other embodiments will now become apparent to those skilled in the art. Accordingly, this invention is not to be limited to that which is shown and described but by the following claims.

I claim:

1. A method of making a multi-layer recyclable interior component for the occupant compartment of an automobile vehicle by molding, comprising the steps of:
    a. forming a finishing layer of polyester fabric for a mold,
    b. forming a multi-layered charge for the mold from;
        a pad of bicomponent fibers including first polyester fibers of PET and second polyester fibers of PET co-polymer fibers with discrete and different ranges of melting temperature, and
        a plurality of sheets of a composite of thermoplastic polyester and glass fibers,
    c. adding heat energy to said multi-layered charge,
    d. inserting said multi-layered charge into the mold with the pad of bicomonent fibers in overlying contact with the finishing layer and closing said mold to configure said interior component, and
    e. opening said mold and removing said interior component.

2. A method of making a rigid composite headliner component for the occupant compartment of an automobile vehicle by molding, comprising the steps of:
    a. forming a finishing layer of polyester fabric for a mold,
    b. forming a multi-layered charge for the mold from;
        a padding of polyester fibers of PET having a relatively high melting temperature intermixed with second polyester fibers of PET co-polymer fibers having a relatively low melting temperature,
        a plurality of sheets of a composite of thermoplastic polyester and glass fibers,
    c. adding heat energy to said charge to effect limited melting of said second polyester fibers,
    d. inserting said charge into said mold with said finishing layer and closing said mold to impose a compressive load on said charge and said finishing layer to configure said composite headliner, and
    e. opening said mold and removing said composite headliner after said composite headliner has cooled and said second polyester fibers have bonded to one another and to the plurality of sheets of said composite of thermoplastic polyester and glass fibers.

* * * * *